No. 698,912. Patented Apr. 29, 1902.
E. F. DURAND.
TRIMMING ATTACHMENT FOR SEWING MACHINES.
(Application filed Apr. 16, 1901.)
(No Model.) 5 Sheets—Sheet 1.

Witnesses
Franck L. Durand
Albert Popkins

Inventor
E. F. Durand
by Sturtevant & Freeley
Attorneys

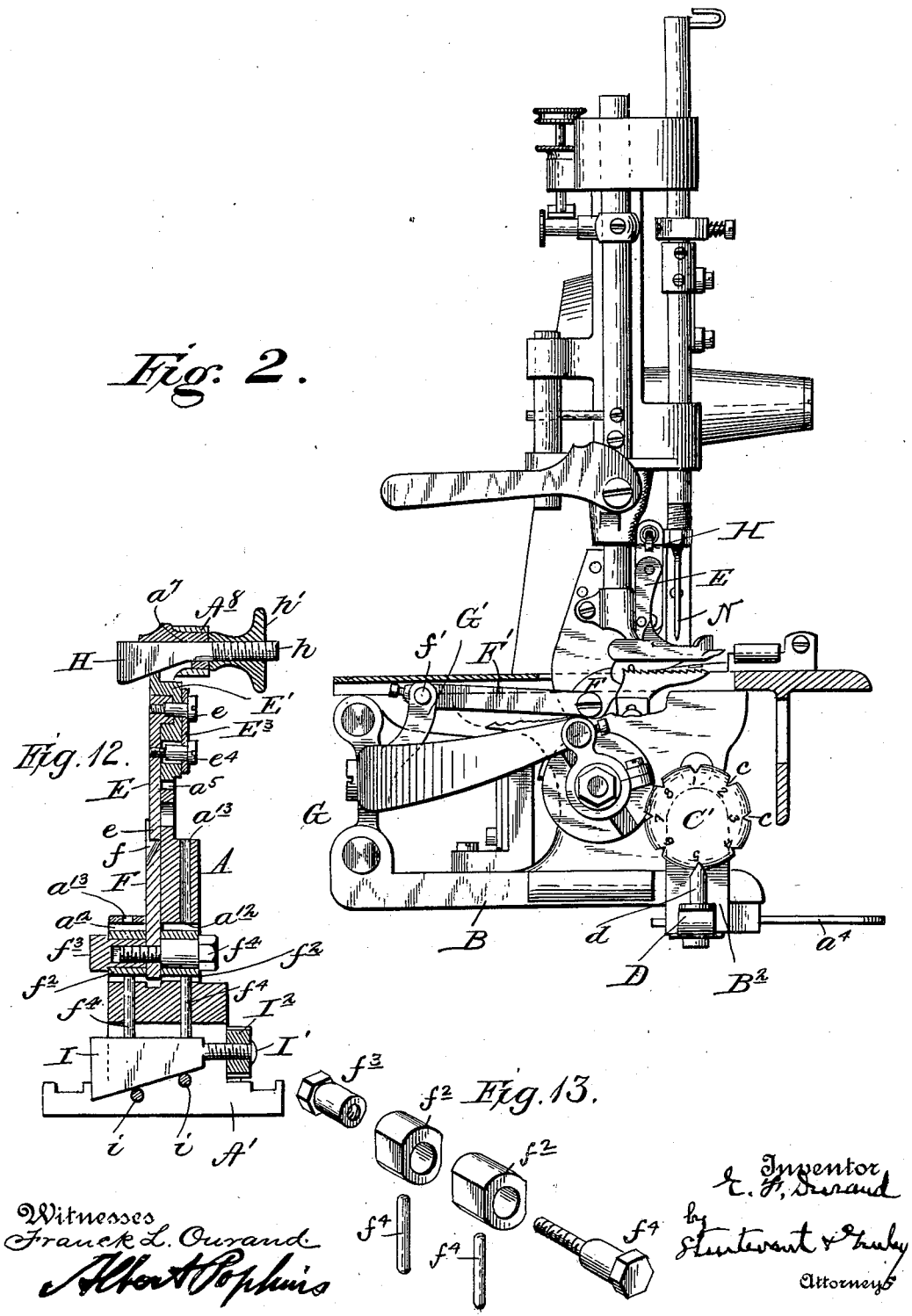

No. 698,912. Patented Apr. 29, 1902.
E. F. DURAND.
TRIMMING ATTACHMENT FOR SEWING MACHINES.
(Application filed Apr. 16, 1901.)
(No Model.) 5 Sheets—Sheet 3.
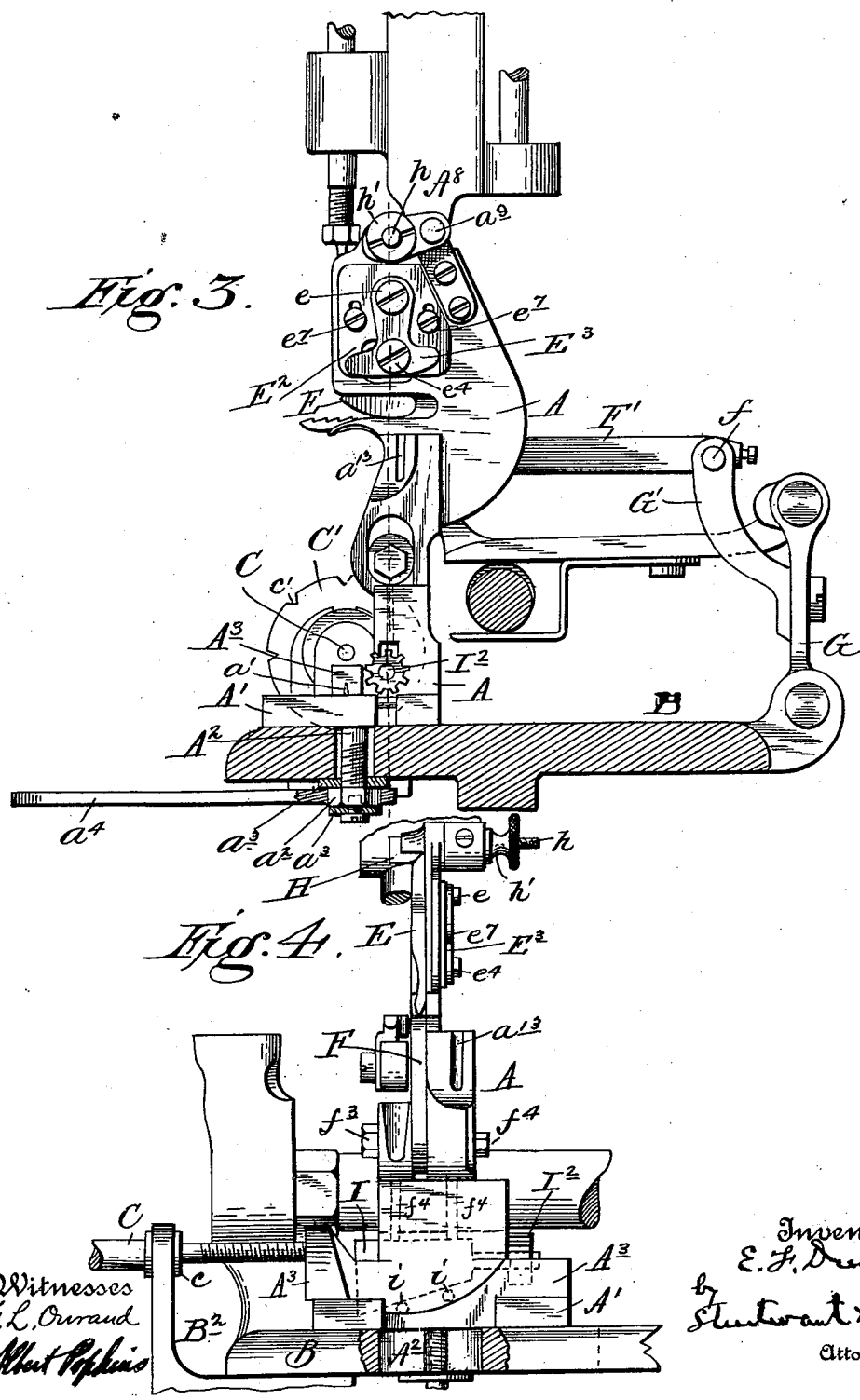

No. 698,912. Patented Apr. 29, 1902.
E. F. DURAND.
TRIMMING ATTACHMENT FOR SEWING MACHINES.
(Application filed Apr. 16, 1901.)
(No Model.) 5 Sheets—Sheet 4.

Witnesses
Franck L. Ourand
Albert Pophius

Inventor
E. F. Durand
by
Sturtevant & Greeley
Attorneys

No. 698,912. Patented Apr. 29, 1902.
E. F. DURAND.
TRIMMING ATTACHMENT FOR SEWING MACHINES.
(Application filed Apr. 16, 1901.)
(No Model.) 5 Sheets—Sheet 5.

UNITED STATES PATENT OFFICE.

ERNEST FREDERICK DURAND, OF PARIS, FRANCE, ASSIGNOR TO THE UNION SPECIAL SEWING MACHINE CO., OF CHICAGO, ILLINOIS, A CORPORATION OF ILLINOIS.

TRIMMING ATTACHMENT FOR SEWING-MACHINES.

SPECIFICATION forming part of Letters Patent No. 698,912, dated April 29, 1902.

Application filed April 16, 1901. Serial No. 56,030. (No model.)

*To all whom it may concern:*

Be it known that I, ERNEST FREDERICK DURAND, a British subject, residing at Paris, in the department of the Seine, France, have invented certain new and useful Improvements in Trimming Attachments for Sewing-Machines, of which the following is a description, reference being had to the accompanying drawings and to the letters of reference marked thereon.

My invention relates to trimming attachments for sewing-machines, known as "Dewees trimmers" and shown in United States Patents Nos. 266,783 and 324,813.

The objects of the invention are to provide means for adjusting the trimmers bodily toward and from the needle to vary the width of the cut; and to provide a simple means for locking the trimmer mechanism to the bed-plate of the machine. These objects I accomplish by the mechanism shown in the accompanying drawings, in which—

Figure 1:
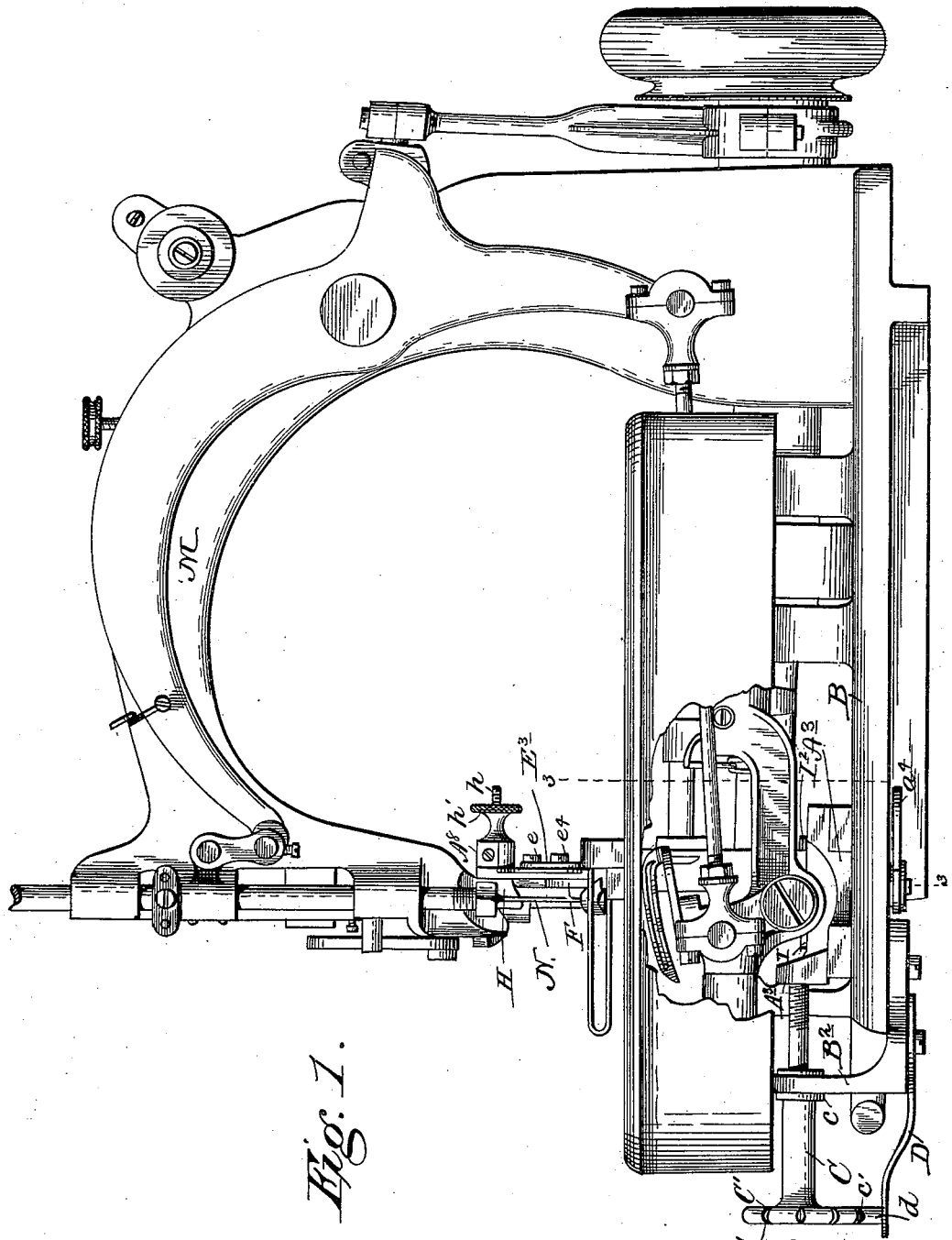
Figure 5:
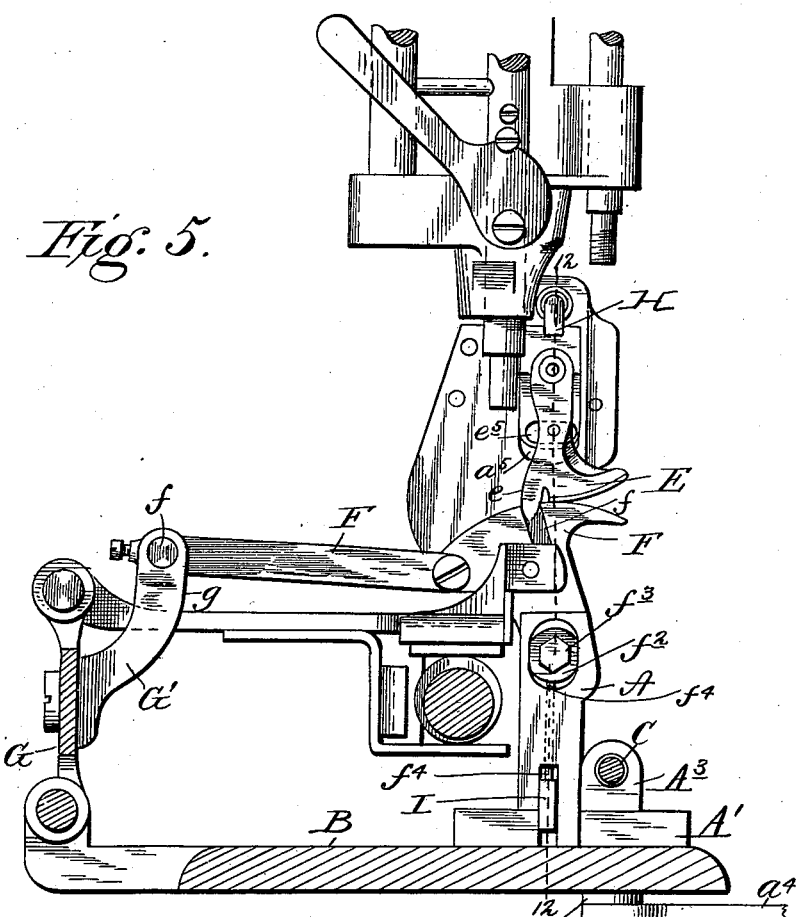
Figure 11:
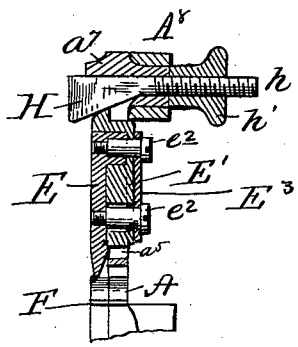

Figure 1 is a front elevation of a Union Special sewing-machine of the type shown in Patent No. 299,568 with my improved trimmer applied. Fig. 2 is an end elevation thereof, the work-plate being in section. Fig. 3 is a section on line 3 3, Fig. 1, looking to the left. Fig. 4 is an enlarged front elevation of the trimmer. Fig. 5 is an end elevation similar to Fig. 1, but having parts of the sewing-machine removed to expose the trimmer. Fig. 6 is a perspective of the trimmer with the upper toggle-jaw and its supporting and adjusting mechanism separated from the bracket. Figs. 7, 8, 9, and 10 are detail views of parts of the trimmer. Fig. 11 is a central vertical section through the upper toggle-jaw and its supporting and adjusting devices; and Fig. 12 is a section through the entire trimmer on line 12 12, Fig. 5.

A designates the vertical trimmer-carrying bracket or standard, which has a flat base $A'$, resting on the bed B of the sewing-machine directly over a longitudinal slot $B'$ therein and through which slot depends the clamping or binding screw $A^2$, formed at its upper end with a T-head $A^3$, which engages a recess $a$ in the front edge of the base and is also held from movement on the base by pins and sockets, as shown at $a'$, Fig. 6. The lower end of the screw is provided with a binding-nut $a^2$, held between two washers $a^3$ and provided with an operating wrench or lever $a^4$.

To the left-hand end of the bed-plate B is secured a bracket $B^2$, in which is swiveled at $c$ the longitudinal adjusting-screw C, in threaded engagement at its inner end with the outer end of the head $A^3$ or other part of bracket A, so that by turning the screw by its handle or knob $C'$ the bracket and the trimmer mechanism, to be presently described, may be moved toward and from the needle N to vary the amount of material removed. The periphery of the knob $C'$ is provided with notches $c'$, into which a tooth $d$ on a plate-spring D snaps to hold the screw to its adjusted position.

The outer face of the knob $C'$ is graduated, as shown in Fig. 2, at the notches, so that the operator may see just how to adjust the screw in order to move the trimmer the desired distance from the needle.

E and F are the two toggle-like trimming-jaws, constructed and geared together by gear-teeth $e f$, as in the Dewees trimmer, before referred to, so as to sever the fabric by rupture or abrasion, in contradistinction to a cutting action. Motion is imparted to the lower toggle-jaw F by a link $F'$, which in turn is pivotally connected at its rear end to the feed-rocker arm G by means of a rigid arm $G'$, having a forked upper end $g$, provided with transverse apertures in which a transverse pin $f$ on the rear end of the link F is free to slide when the bracket A is adjusted by its screw C.

The upper toggle E is provided with a circular apertured pivot-lug $e'$ at the inner face of its upper end, and this pivot $e'$ is in turn seated in a circular recess $e^2$, formed in the adjacent face of a slide $E^2$, mounted to slide in the oblong recess $a^5$ in the upper end of the bracket A. (See Figs. 6, 11, and 12.) The toggle-jaw E is held to the slide $E^2$ by means of the screw, which passes through the aperture $e^3$ (see Fig. 7) and through an aperture in the upper end of an inverted-T-shaped washer-plate E. A second screw $e^4$ connects the lower end of this plate $E^3$ with the toggle E and passes freely through an elongated slot $e^5$, and so the toggle E and washer $E^3$ rock together on the slide, and the lower end of the toggle is held from lateral movement. The edges of the slide $E^2$ project beyond the slot or recess $a^5$ and are provided with parallel vertical slots $e^6$, through which pass the screws $e^7$, which hold the slide to the bracket A. The slide $E^2$ is adjusted by means of a wedge H, which engages its upper edge, (see Figs. 11 and 12,) and is provided with a screw-stem $h$, passed through a sleeve $a^7$ on the upper end of the bracket A and provided at its end with an adjusting-nut $h'$.

The upper end of bracket A is provided with an arm $A^8$, mounted rigidly on the sleeve $a^7$ and provided with a guide-aperture $a^9$, through which passes a guide-pin $a^{10}$, projecting from the lower end of the arm M of the sewing-machine. Thus the upper end of bracket A is held in sliding connection with a portion of the frame of the machine, and so twisting or improper movement is prevented.

The lower toggle-lever F extends into a vertical slot formed in the bracket A, which slot is intersected by a transverse slot $a^{12}$, having straight vertical walls to guide the vertically-adjustable tubular bearing-blocks $f^2$, held in place by the sleeve-nut $f^3$ and screw $f^4$, (see Figs. 12 and 13,) the said screw and nut clamping the lower end of toggle-jaw F firmly between them and forming trunnions therefor, which rock in the bearing blocks or sleeves $f^2$. These blocks or sleeves $f^2 f^2$ rest on vertically-movable pins $f^4 f^4$, (see Fig. 12,) which pins in turn rest on the upper flat side of a wedge I, mounted in a slot in the base $A'$, with its inclined lower edge bearing on transverse supporting-pins $i\ i$, crossing the slot.

The wedge I is provided with a screw-shank $I'$, having an adjusting-nut $I^2$, notched for a spanner-wrench, and so by turning this nut the wedge will be moved in or out to raise or lower the pins $f^4$ equally. These pins are inserted through the vertical bores $a^{13}$, as shown clearly in Fig. 12.

The adjustment of the two toggle-jaws E F is effected by the two wedges H I, and the trimmer as a whole is adjusted toward and from the needle by means of the screw C and set in this position by the nut $a^2$. The operation of the two toggle-jaws is, as before stated, well known in the art and need not be gone into in detail.

As the sewing-machine shown is one of a well-known type, its various members will not be described and are shown merely to illustrate the trimmer in operative relation to a machine.

Having thus described my invention, what I claim as new, and desire to secure by Letters Patent, is—

1. The combination with a sewing-machine, of a bracket in sliding connection at its lower and upper ends respectively with the bed-plate and head, means for adjusting the bracket toward and from the needle, means for securing the bracket to the bed when adjusted, and a trimming mechanism mounted on the bracket and operatively connected with a moving part of the sewing-machine; substantially as described.

2. The combination with a sewing-machine, having a feeding mechanism including a feed-rocker, of a bracket in sliding connection with the bed-plate and provided with means for adjusting it laterally toward and from the needle, a pair of toggle-like trimming-jaws mounted on the bracket, and a link connection between one of the jaws and the feed-rocker of the machine to operate the trimming-jaws, and permit adjustment of the bracket; substantially as described.

3. The combination with a sewing-machine, of a bracket in sliding connection with the bed-plate and provided with means for adjusting it laterally toward and from the needle, a pair of toggle-like trimming-jaws mounted on the bracket, and a link pivoted to one of said jaws, and having a pivotal and sliding connection with the feed-rocker of the sewing-machine; substantially as described.

4. The combination with a sewing-machine, including a feed-rocker at the rear, provided with an arm having a forked upper end, of a bracket in sliding connection with the bed-plate and machine-head as at $a^9$, means for adjusting the bracket laterally toward and from the needle, toggle-like trimming-jaws mounted on the bracket, and a link pivoted at its forward end to one jaw and at its rear end provided with a pivot-pin turning and sliding in said forked feed-rocker arm; substantially as described.

In testimony whereof I affix my signature in presence of two witnesses.

ERNEST FREDERICK DURAND.

Witnesses:
EDWARD P. MACLEAN,
JOHN BAKER.